United States Patent
Oberhardt et al.

(10) Patent No.: US 6,870,597 B2
(45) Date of Patent: Mar. 22, 2005

(54) APPARATUS AND METHOD FOR OPTICALLY PROJECTING PIXEL-BASED IMAGE INFORMATION ONTO A LIGHT-SENSITIVE MATERIAL

(75) Inventors: Knut Oberhardt, Holzkirchen-Foching (DE); Gudrun Taresch, Munich (DE); Markus Ehbrecht, Munich (DE); Reimund Munch, Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/379,088

(22) Filed: Mar. 4, 2003

(65) Prior Publication Data

US 2003/0174227 A1 Sep. 18, 2003

(30) Foreign Application Priority Data

Mar. 12, 2002 (EP) .............................. 02005560

(51) Int. Cl.⁷ ................ G03B 27/00; G03B 27/32; B41J 2/47
(52) U.S. Cl. .................. 355/18; 355/77; 347/239; 347/241
(58) Field of Search .................. 355/18, 39, 40, 355/54, 77; 348/218.1; 347/239, 241, 229, 231

(56) References Cited

U.S. PATENT DOCUMENTS

| | | | |
|---|---|---|---|
| 3,650,605 A | * 3/1972 | Little, Jr. | ..................... 359/15 |
| 4,333,112 A | 6/1982 | Matsumoto | |
| 4,707,743 A | 11/1987 | Tokumitsu et al. | |
| 4,755,876 A | * 7/1988 | Dangler | ..................... 358/494 |
| 5,400,070 A | * 3/1995 | Johnson et al. | .......... 348/219.1 |
| 5,995,129 A | * 11/1999 | Sunagawa et al. | .......... 347/239 |
| 6,075,235 A | * 6/2000 | Chun | ..................... 250/208.1 |

FOREIGN PATENT DOCUMENTS

| | | |
|---|---|---|
| CH | 672 385 A5 | 11/1989 |
| EP | 0 871 327 A1 | 10/1998 |
| EP | 0 987 875 A1 | 3/2000 |

* cited by examiner

Primary Examiner—Alan Mathews
(74) Attorney, Agent, or Firm—Darby & Darby

(57) ABSTRACT

An apparatus for optically projecting pixel-based image information onto a light-sensitive material has an image-generating device, an optical projection device, and a device for laterally offsetting the projected image of the image-generating device to produce a plurality of mutually offset partial images in the image plane. The offsetting device has two optical elements arranged in sequence in the light path of the projection. The projected partial images are offset relative to each other by tilting one or both of the optical elements.

10 Claims, 1 Drawing Sheet

APPARATUS AND METHOD FOR OPTICALLY PROJECTING PIXEL-BASED IMAGE INFORMATION ONTO A LIGHT-SENSITIVE MATERIAL

BACKGROUND OF THE INVENTION

The invention relates to an apparatus and a method for optically projecting pixel-based image information onto a light-sensitive material. An apparatus of the kind that the invention seeks to improve has a device for generating partial images, an optical projection device, and a device for laterally offsetting the projection of the image-generating device to produce the partial images in the plane of the light-sensitive material. In a method of the kind that the invention seeks to improve, partial images of the pixel-based information are produced with an appropriate image-generating device. The projection of the image-generating device is moved in the lateral directions to produce the partial images in the plane of the light-sensitive material.

When producing an image of graphic information on a light-sensitive material, the aim is to maximize the detail resolution of the image. This is of particular importance in cases where the image-generating device is based on an electronic working principle. In electronic image-generating devices, the graphic information is generated as an assembly of individual pixels, where each pixel is represented by an individually controllable indicating element or elementary image component. However, image-generating devices based on this concept that are within a reasonable cost range have a resolution that is not adequate for producing images with a fine resolution at the quality level of photographs.

Thus, if the image information represented on an LCD (liquid crystal device), a DMD (digital mirror device) or another light modulator is to be projected onto a light-sensitive material such as a photographic paper, there are known methods of increasing the image resolution by using sequential projections of partial images. For example, to achieve a fourfold increase in resolution, only a fourth of the image data assigned to an LCD element of the image-generating device are processed in a first exposure, while the other three fourths of the LCD element are covered by a mask. In a second exposure, the projection of the LCD is moved, so that a second one-fourth of the total image information can be projected onto areas that were not previously exposed, and so on, continuing with a third and fourth exposure. After four exposures, each representing one-fourth of the total image information, a reproduction of the image is obtained with four times the resolution of the LCD array.

A method of generating a digital image is known from EP 0 987 875, where in essence an LCD device is projected onto an image carrier by means of an objective lens. A rotatable glass plate is used to produce a lateral offset of the projected pixels in the image plane, and the image carrier is exposed either once or more than once for each position of the projected image.

In order to set the glass plate into the correct position for each exposure, it is necessary to always know the current position. However, this requires a sensor arrangement with a very high resolution and a commensurately complex means of processing the sensor signals. Even with the use of expensive components, the accuracy and speed of positioning continue to be a problem.

OBJECT OF THE INVENTION

The present invention has the objective to provide an apparatus and method whereby the position of a projected image of the LCD elements on a light-sensitive film can be shifted reproducibly, and where the switching between the individual shift movements is fast and reliable.

SUMMARY OF THE INVENTION

According to the invention, an apparatus for optically projecting pixel-based image information onto a light-sensitive material has a device for generating partial images, an optical projection device, and a device for laterally offsetting the projection of the image-generating device to produce the partial images in the plane of the light-sensitive material. Specifically, the device that moves the projected image to a laterally offset position has two optical elements arranged one after the other in the light path, with each of the two elements being movable.

With the two movable or, more specifically, tiltable optical elements arranged in series in the light path of the projection with their tilt axes oriented at a right angle to each other, the projected image of the LCD elements can be shifted in any direction on the photo-sensitive film. There are simple means of exactly delimiting the movement of the tiltable optical elements, so that the projection of the pixels onto a light-sensitive film is reproducible with a high degree of accuracy without the need to detect the position of the optical element prior to moving it.

With the freedom to move the projected images of the LCD elements in any desired direction by any desired amount, the inventive apparatus offers the advantage that a calibration mode can be realized in which the pixels are displaced into a different offset position than in the actual printing mode.

One purpose of the calibration mode is to identify defective LCD elements, so that appropriate correction algorithms can be applied to the image data prior to the exposure process. This requires the defective LCD elements to be represented in a way that makes them as noticeable as possible and facilitates their detection. In the calibration mode, the lateral displacement of the projected images of the LCD elements is therefore controlled in such a manner that the individual images of each pixel in the image plane are projected directly adjacent to each other. Thus, with a fourfold enhancement of the LCD resolution, each LCD element generates a macro pixel of four times the basic pixel size, so that a defective pixel becomes very visible.

On the other hand, if a failure of an LCD element occurs between two calibrations, the defective pixel should have as little noticeability as possible in the images. In the exposure process, the displacement of the projection of the LCD elements is therefore controlled in such a manner that the individual projected images of an LCD element are spaced farther apart from each other. Thus, a defective LCD element will not manifest itself as a highly visible macro pixel, but will cause a number of small pixels corresponding to the number of displacements, where the faulty pixel images are spaced at a certain distance from each other and are hardly noticeable to the naked eye.

As a preferred concept of the invention, the apparatus has at least a pair of end stops defining an angle by which at least one of the two optical elements can be tilted. The optical elements, for example glass plates, can thus be moved against the end stops so that they are shifted from one end position to the other with high speed and high accuracy.

In order to achieve a distortion-free image, the tilt axes of the optical elements intersect the optical axis of the light path at a right angle.

The apparatus according to the invention serves to produce an image on the light-sensitive material with a higher level of resolution than, e.g., the LCD device that is used to generate the image. This is accomplished through an arrangement where the light-sensitive material is exposed more than once, with only a part of the surface of the light-sensitive material being exposed in each of the different exposures. This concept can be realized, e.g., with a mask that covers a part of each LCD element. The surface areas of the light-sensitive material that were not exposed in the exposure of a first partial image are exposed in the subsequent exposures of the remaining partial images. Based on this concept, each LCD element produces a plurality of image elements—each with a different graphic information content—on different surface locations of the light-sensitive material. This process generates an image with complete coverage of the light-sensitive material surface in the image plane and with a resolution that is a multiple of the resolution of the LCD device.

BRIEF DESCRIPTION OF THE DRAWINGS

Further distinctive traits and advantages of the invention will be discussed in the following description of a preferred embodiment as illustrated in the attached drawing, FIG. 1, which schematically shows the light path in an embodiment of the inventive apparatus.

DETAILED DESCRIPTION OF PREFERRED EMBODIMENTS

Figure 1:
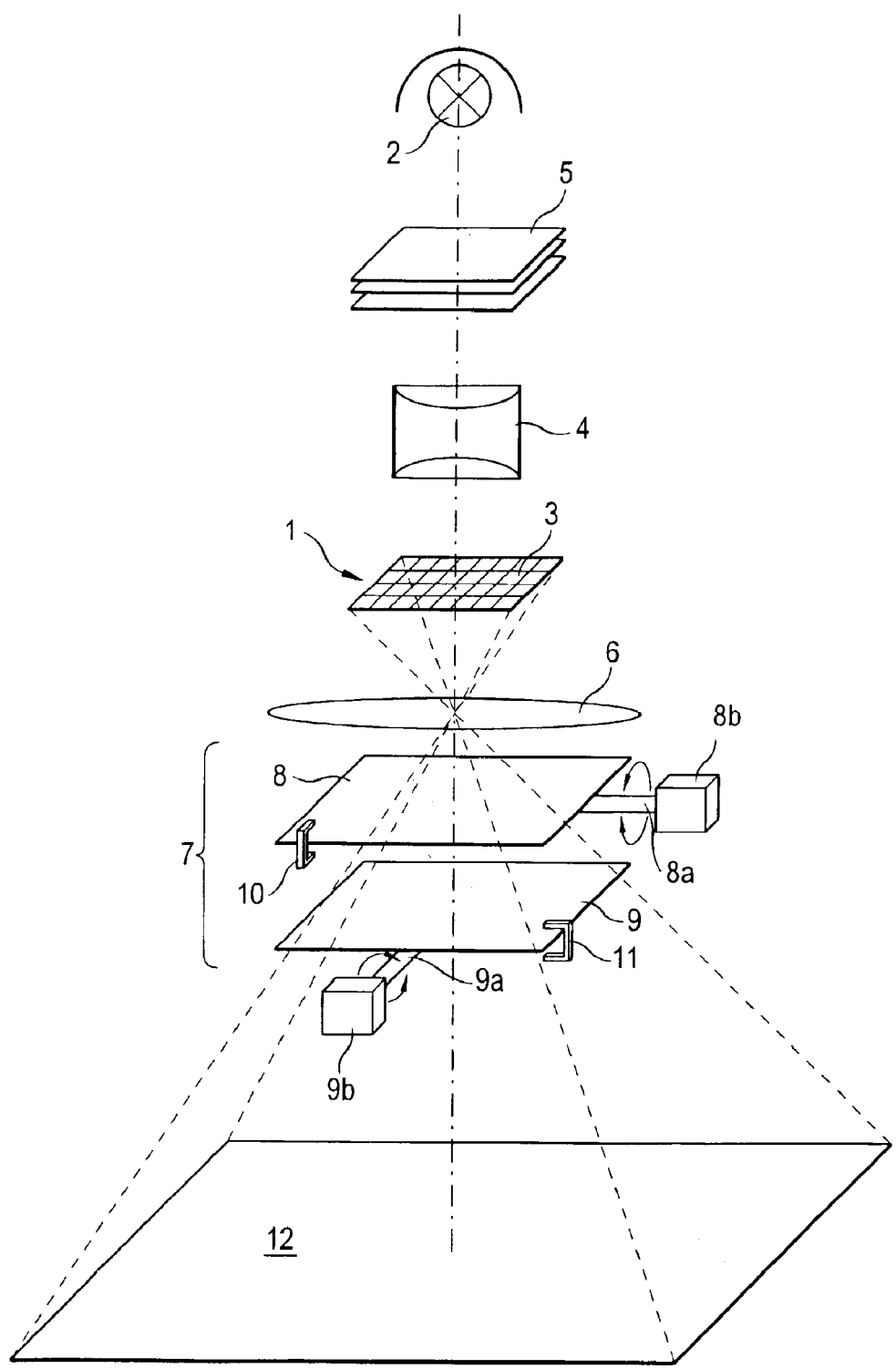

FIG. 1 shows a partially perspective view of the optical projection system that is used to produce a projected image on a light-sensitive film. The optical axis of the projection system is represented in FIG. 1 by a dash-dotted line.

By means of an LCD device 1, a graphic pattern is generated which is illuminated by a light source 2. The pattern on the LCD device 1 is generated by individual LCD elements 1 that are individually controllable and are partially covered by a mask (not shown in the drawing). In order to obtain a four times higher resolution in the projected image than in the LCD device 1, three fourths of the surface of each LCD element 3 are covered up by the mask.

The light of the lamp 2 is colored by filters 5 that can be individually swiveled into the light path. The condenser 4 aligns the light, so that the LCD device receives hard (i.e., non-diffused) light.

As an alternative to a lamp with color filters, the colored light required for the projected image can also be generated by LEDs. With an LED-based concept, it is irrelevant whether one mixed-color LCD array is used or the light of several differently colored LCD arrays is brought together in the light path.

With an optical projection system 6, the pattern generated by the LCD device 1 is projected onto the photographic paper 12.

A device 7 for laterally shifting the projected image of the individual LCD elements is arranged between the projection system 6 and the light-sensitive surface of the photographic paper 12.

The arrangement described so far, which reflects the known state of the art, is modified under the invention with regard to the device 7 for the lateral shifting of the projected image of the LCD elements 3 in the plane of the photographic paper 12. The device 7 according to the invention has two tiltable planar-parallel glass plates 8 and 9. The glass plates 8 and 9 are arranged to follow one another in the light path between the optical system 6 and the image plane of the light-sensitive coating of the photographic paper.

The glass plates 8 and 9 perform the function of causing a parallel offset of the light path depending on the respective amounts and directions of tilt in each of the glass plates. As a result, the image projected from each of the LCD elements 3 into the plane of the photographic paper 12 can be shifted within a considerable range of movement by an arbitrarily selected distance and in an arbitrary direction. The shift is effected by tilting the two planar-parallel glass plates 8 and 9. While the tilt angle of the glass plate 8 determines the amount of shift in the y-direction, the tilt angle of the glass plate 9 determines the amount of shift in the x-direction of the image plane. By combining different tilt angles of the two glass plates, it is therefore possible to realize any desired shift of the projected image.

The tiltable planar-parallel glass plates 8 and 9 preferably have a thickness of 1 to 2 millimeters. The centers of the plates lie on the optical axis of the apparatus. Thus, the invention can be put into practice without the need for additional elements with defined surface curvatures, so that the inventive concept can be realized at a low cost.

The two glass plates 8 and 9 are tiltably supported. Actuating devices 8b and 9b are provided to rotate the glass plates 8 and 9 about their respective tilt axes 8a and 9a.

As the image-generating elements of an LCD device have a rectangular surface, the tilt axes 8a and 9a are arranged parallel to the base lines of the LCD elements 3 at a right angle to each other. In order to avoid a distortion of the image, the tilt axes 8a and 9a are arranged in parallel planes that are traversed perpendicularly by the optical axis of the light path. Both tilt axes intersect the optical axis of the light path.

In a preferred embodiment of the invention, the respective tilt angles of the optical elements 8 and 9 are delimited by pairs of end stops 10 and 11. In their simplest configuration, each of the pairs of stops 10 and 11 consists of two horizontal prongs that are connected to each other, limiting the tilt movement in the upward and downward direction and thereby defining an angular range within which the two glass plates 8 and 9 can be tilted. The magnitude of the angular shift between the end stop positions is between 1° and 10°, depending on given parameters of the apparatus or application. Of course, it is also conceivable to use a position-controlling mechanism for the glass plates that would function with a sufficient degree of accuracy, so that the end stops would be redundant.

The inventive method for optically projecting pixel-based image information onto a light-sensitive material 12 can be performed with the apparatus of the foregoing description.

Under the method according to the invention, the optical elements 8 and 9 are tilted about their respective tilt axes 8a and 9a which are oriented at a right angle to each other. The tilting causes a lateral offset of the light path, whereby the position of the image in the image plane 12 can by shifted as required.

The inventive concept of two independently controllable optical elements 8 and 9 has the significant advantage that the pixel images can be projected to freely selectable positions in the image plane. This provides the possibility of a calibration process where individual LCD elements 3 are projected to different locations than in the normal operating mode of the apparatus, i.e., in the photo-printing of images. In order to prevent defective LCD elements from being noticed as visible flaws in a picture, the several different image pixels that are generated by one and the same LCD element can be spaced apart by a certain distance so that they are not directly adjacent to each other. The calibration, however, requires the exact opposite: The different pixels generated by one LCD element should be contiguous so that they form a "macro pixel". This significantly facilitates the detection of defects of the LCD device 1. The different requirements for the photo-printing of pictures and for the calibration of the printing apparatus cannot be satisfied with the concept of one rotating glass plate, but can for the first time be met with the arrangement of the two tiltable glass plates.

The ease of adjusting the apparatus presents itself as a further advantage of the invention. If in the assembly process, the glass plates are installed with their tilt axes not perfectly orthogonal to each other or misaligned with the LCD device, the error can be compensated by applying an appropriate correction to the program parameters that control the tilt movement. A shift of the partial image in the x-direction of the image plane can in this case be accomplished through appropriate tilt movements of both glass plates instead of only one glass plate. In a four-position shift cycle, the exposures of all of the four partial images would be accomplished with tilt-movements of both glass plates.

What is claimed is:

1. An apparatus for optically projecting pixel-based image information onto a light-sensitive material that extends in an image plane, the apparatus comprising an image-generating device for producing partial images, an optical projection device, and an offsetting device for laterally offsetting a projected image of the image-generating device to produce a plurality of mutually offset partial images in the image plane, wherein the image-generating device, the projection device and the offsetting device are arranged in a light path of the apparatus, wherein the offsetting device comprises a first optical element and a second optical element arranged one after the other in the light path, and wherein each of the first and second optical elements is movable.

2. The apparatus of claim 1, wherein said first and second optical elements are tiltable, the first optical element being tiltable about a first tilt axis and the second optical element being tiltable about a second tilt axis, and wherein the first and second tilt axes are perpendicular to each other.

3. The apparatus of claim 2, wherein at least one of the first and second optical elements has a pair of end stops delimiting an angular range within which said at least one optical element is tiltable.

4. The apparatus of claim 2, wherein the light path extends along an optical axis and wherein the first and second tilt axes intersect the optical axis at right angles.

5. A method for optically projecting pixel-based image information onto a light-sensitive material that extends in an image plane, comprising the steps of:

producing at least one first partial image in a first position in the image plane by means of an image-generating device that is operable to generate partial images from the pixel-based image information, and producing at least one further partial image in at least one further position in the image plane, wherein the further position is offset in relation to the first position by moving a first optical element and a second optical element that are arranged one after the other in a light path of said optical projection.

6. The method of claim 5, wherein the first optical element is tiltable about a first tilt axis and the second optical element is tiltable about a second tilt axis, said first and second tilt axes being oriented at a right angle to each other, and wherein said first and second optical elements are moved by tilting said optical elements about their respective tilt axes.

7. The method of claim 6, wherein the tilting of the first and second optical elements is limited to a tilt angle that is delimited by end stops.

8. The method of claim 5, wherein the light path extends along an optical axis and wherein for the steps of producing said first and at least one further partial images, each of the first and second optical elements is positioned at an angle other than 90° relative to the optical axis.

9. The method of claim 5, wherein for each of the first and at least one further positions, three partial images in different colors are projected onto the light-sensitive material.

10. The method of claim 5, wherein the a least one further partial image comprises a plurality of further partial images, and wherein the producing of said further partial images occurs sequentially by projecting one partial image after another onto the light-sensitive material.

* * * * *